July 14, 1953 R. HARDY 2,645,711
PANORAMIC RECEIVER
Filed May 24, 1943 9 Sheets-Sheet 1

Inventor
RENE HARDY

By

Attorney

July 14, 1953  R. HARDY  2,645,711
PANORAMIC RECEIVER
Filed May 24, 1943  9 Sheets-Sheet 2

Inventor
RENE HARDY
By *R. P. Morris*
Attorney

July 14, 1953  R. HARDY  2,645,711
PANORAMIC RECEIVER
Filed May 24, 1943  9 Sheets-Sheet 3

Inventor
RENE HARDY
By RP Morris
Attorney

July 14, 1953  R. HARDY  2,645,711
PANORAMIC RECEIVER
Filed May 24, 1943  9 Sheets-Sheet 4

Inventor
RENE HARDY
By
Attorney

R. HARDY 2,645,711

PANORAMIC RECEIVER

Filed May 24, 1943

INVENTOR
RENÉ HARDY

BY
ATTORNEY

July 14, 1953  R. HARDY  2,645,711
PANORAMIC RECEIVER
Filed May 24, 1943  9 Sheets-Sheet 7

INVENTOR
RENÉ HARDY
BY Edward D. Phinney
ATTORNEY

INVENTOR
RENÉ HARDY
BY
ATTORNEY

July 14, 1953

R. HARDY 2,645,711

PANORAMIC RECEIVER

Filed May 24, 1943

INVENTOR.
RENÉ HARDY

BY
ATTORNEY

Patented July 14, 1953

2,645,711

UNITED STATES PATENT OFFICE 2,645,711

PANORAMIC RECEIVER

René Hardy, Lyon, France, assignor to International Standard Electric Corporation, New York, N. Y.

Application May 24, 1943, Serial No. 488,297
In France June 30, 1941

Section 1, Public Law 690, August 8, 1946
Patent expires June 30, 1961

12 Claims. (Cl. 250—20)

The present invention relates to radioelectric receiving systems arranged for effecting simultaneous supervision of all the transmissions in progress in a certain frequency band.

These receivers are usually provided with means for varying their tuning frequency automatically and continuously through the desired frequency band, and means for causing the appearance of the indications of all the transmissions that are met with in the course of the frequency scanning effected in this way on an indicating instrument that gives instantaneous readings, preferably a cathode ray tube. However, and particularly when the explored frequency band is wide, the indications that appear on the oscillograph's screen may be too close together, irrespective of the scanning method of the indicator that is used, whether linear, circular or other, on account of the proximity of the transmissions in progress in the narrow portions of the explored frequency band.

The objects of the invention consequently comprise the providing of means for permitting precise observation of all the stations that are transmitting within the supervised wide frequency band.

Another object of the invention is the providing of means that make it possible to know by direct observation the portion of the supervised wide frequency band in which a monitoring receiver associated with the control receiver is operating. According to certain of its features, the invention provides means for causing the appearance on the screen of an indicator, e. g. a cathode ray tube, of the simultaneous indications of all the transmissions in progress within a frequency band while at the same time causing the appearance on the screen of another indicator, such as a cathode ray tube, of the indications in greater detail or on a larger scale of transmissions in progress.

According to another feature of the invention, means are provided in a control system using a cathode ray indicator that furnishes simultaneous indications of all the transmissions in progress in a frequency band for causing the appearance on a second indicator of one or more reference lines corresponding to definite regions of the general reference line on the first indicator, the indications produced on the second indicator being accordingly on a larger scale or on scales at greater intervals from each other.

According to another feature of the invention, means are provided for modifying as desired or automatically the location in the total supervised frequency band of the region of which a detailed indication is obtained.

According to another feature of the invention, the reference line or lines that correspond on the indicating tubes to the particular regions for which it is desired to obtain a detailed indication are differentiated from the other reference lines, e. g. by making only them luminous or by giving them a more intense luminosity than the others.

According to another feature of the invention, the narrow portion of the frequency band to which a monitoring receiver associated with the control receiver is adjusted, is differentiated from the reference lines used for supervision by being given a more intense luminosity than the others.

A control receiver that employs features of the invention comprises two indicators, preferably of the cathode ray type, one of which is scanned by means of a voltage having a frequency higher than the scanning voltage of the other but synchronized to the latter in order to carry out its complete scanning during a portion of the time taken for the scanning of the other indicator. Furthermore, the reference lines on each indicating screen may be made multiple by using sweep voltages having a speed greater than the frequency scanning speed of the receiver.

The invention and its various features are explained in detail in the description given hereunder with reference to the appended drawings, in which.

The distribution of the transmitting stations in a wave range is never uniform and the wave lengths in a narrow band are sometimes common or very close to each other.

Figures 1, 2:
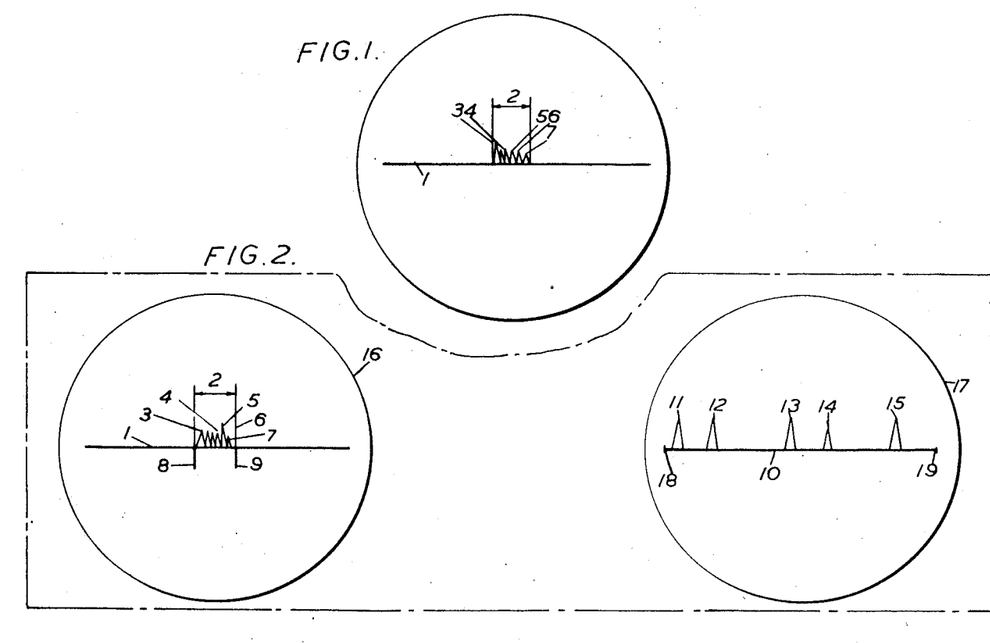
Fig. 1 illustrates a reference line of a control indicator of transmissions in progress showing the conglomeration of the luminous traces of stations on a narrow portion of the supervised frequency band.
Fig. 2 illustrates, according to one feature of the invention, one example of a main indicator and of a vernier indicator showing details of the indications obtained on a portion of the reference line of the main indicator.

When using a control receiver that permits a simultaneous appearance on an indicating instrument, such as a cathode ray tube, of the traces of all the transmissions in progress in the supervised frequency band, a certain number of traces of stations 3, 4, 5, 6, 7, massed in the space 2 will be observed on a reference line 1 as shown in Fig. 1, for example. That is a general indication, but one that does not permit separation of the various transmissions with precision.

In order to retain the general indication while still having a detailed indication of the stations whose traces are grouped in the space 2, certain features of the invention provide for the addition to indicator 16 that gives the reference line 1 (Fig. 2) of another indicating device 17 that can cause the appearance of the stations 3, 4, etc. that are grouped in the space 2 on the reference line 1, in the form of distinct traces 11, 12, 13, etc. on a reference line 10 of suitably greater scale. The length 18, 19 of this reference line 10 may be considerably greater than the space 2 and two guide marks 8 and 9 are provided on the reference line 1 which correspond at the points 18 and 19 of the reference line 10. When, by means of suitable adjustment, it is desired to show details of one or the other region of the supervised frequency band, means are provided for shifting the indexes 8 and 9 on the reference line 1 and the observed stations are aligned on the more detailed reference line 10.

Let us assume that the frequency scanning of the receiver is effected by electronic means, e. g. by means of a sawtooth voltage like 20 (Fig. 3), that control the frequency variation of the frequency changing or local oscillator stage of the receiver. If the sawtooth voltage that controls the variation of the frequency of the oscillation has a period 21 and an amplitude 22, then this amplitude 22 will correspond to the length of the reference line 1. When it is desired to see in detail what is taking place at a point of the linear variation of line 20, e. g. during the time interval 23 that corresponds to the very short displacement 24 with respect to the total amplitude 22, use will be made of the second reference line 10 (Fig. 2). This is obtained by means of a second sawtooth voltage 25 (Fig. 3) of very rapid variation, and of an amplitude 26 that corresponds to the length of line 10 and of duration 23; this voltage will be produced during the period 27—28 of line 20 and corresponds to the amplitude variation 24 of this line, which is a small portion of the total frequency scanning of the receiver.

This second linear scanning may be effected on a second cathode ray tube, as shown at 17 in Fig. 2. However, it is likewise possible to successively commutate the two scannings to the deflection elements of the same cathode ray tube in order to obtain the two lines 1 and 10 on the same screen, or else to use for this purpose an especially designed cathode ray tube having two electron guns and having the reflection of the two beams independent. In order to observe the two series of indications on the same screen, use may be made of two different cathode ray tubes disposed at 90° from each other and a translucent screen can be placed at 45° between these screens in order to directly see the indications of one through this translucent screen and the indications of the other by reflection on this screen.

If the same modulation or vertical deflection is applied to the two scanning systems that produce the reference lines 1 and 10 in order to cause the appearance on them of the luminous traces of the transmitting stations that are operating, the successive traces 3, 4, 5, of reference line 1 during the short space of time 2 will correspond to the same stations indicated by the more clearly separated traces 11, 12, etc. of reference line 10 because of the fact that the horizontal movement of the beam of tube 17 producing line 10 is much more rapid than that of the beam producing line 1 in tube 16. The sawtooth voltage 25 (Fig. 3) may be brought into the position that corresponds to the time interval 23 of the scanning voltage 20 with a suitable phase, either by progressively shifting it by means of synchronizing currents of sinusoidal or any other shape in the well known manner, or by using the sawtooth voltage of the period 23 over a certain number of periods and by blocking the scanning of the indicator that gives the reference line 10 at all the periods of the sawtooth voltage 25 except one that occurs at the desired moment.

The details of the circuits that supply the sawtooth voltages will not be given since numerous arrangements for generating waves of this kind are well known in the art.

The size of the frequency range covered by the vernier 17 depends on the slope of the sawtooth voltage 25. This slope may be modified by progressive or abrupt variation so as to explore larger or smaller zones of the total frequency band supervised by means of indicator 16. The guide marks 8 and 9 that delimit on reference line 1 the region in which the vernier is used, as well as the traces 18 and 19 of the beginning and end of line 10, can be obtained by transforming the initial and termination points of a sawtooth 25 into brief impulses.

Figures 4, 5:
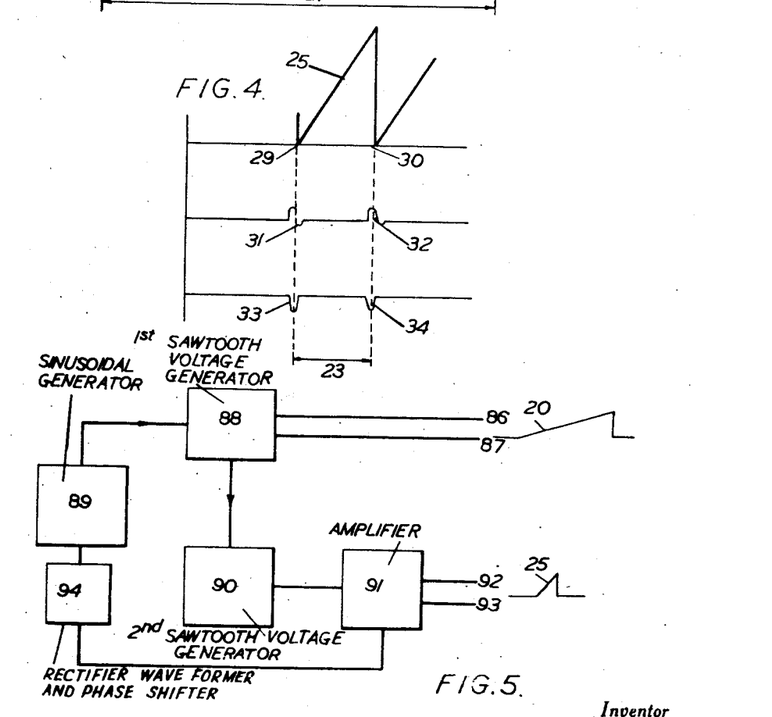
Fig. 4 shows the manner in which it is possible to obtain guide marks for the delimitation of regions on an indicator that employs features of the invention.
Fig. 5 illustrates, according to one feature of the invention, an example of a circuit that generates the two relaxation voltages of Fig. 3 for the control and vernier indicators.

Fig. 4 illustrates a sawtooth wave form 25, and voltages of the sine-wave or impulse shape shown at 31 and 32, or at 33 and 34, respectively, can be obtained for the moments 29 and 30 by means well known to the art. The shape of the initial and terminating impulses for detailed observation is preferably different from that of the luminous traces of the transmissions in progress. If these traces appear on lines 1 and 10 in the form of vertical impulses that are produced above this line, use may be made for the guide mark indications of the traces 33 and 34, which are vertical but are produced below line 1 or 10, or the traces 31 or 32 that project from both sides of line 1 or 10 may be used.

In order to avoid on screen 17 (Fig. 2) the superposition of the modulation traces that correspond to spaces other than that comprised between the points 8 and 9 of screen 16, it is possible to block the operation of the modulation stage that feeds the cathode ray tube 17 for the entire time that does not correspond to the space 8—9. The modulation stage may be blocked by biassing the tube of the output stage near the cutoff of the plate current, for example, and to keep it strongly negative at such a point that there will be no plate current to bring it back to a normal working point except during the time interval 8—9.

Figure 3:
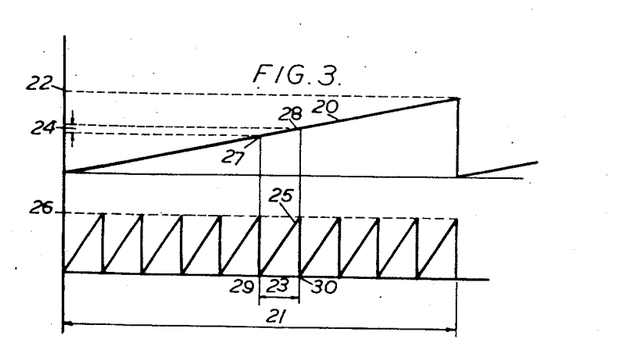
Fig. 3 illustrates two scanning voltages that can be used, according to certain features of the invention, for effecting the scannings of the two associated indicators of Fig. 2.

Another arrangement consists in avoiding lateral scanning of the cathode ray tube 17 for the entire time except during the time interval that corresponds to the sawtooth 25 (Fig. 3). At the terminals 86, 87 (Fig. 5) there is generated a low frequency sawtooth voltage that is intended for the scanning of line 1 of tube 16 (Fig. 2), for example.

This relaxation voltage is produced by the generator 88 which can itself by synchronized by the sinusoidal generator 89. The second sawtooth voltage generator 90 is synchronized by generator 88. This second generator 90 produces a sawtooth voltage of a much more rapid frequency and, e. g. by means of an amplifier stage 91, it feeds the terminals 92, 93 of the deflection circuit of the cathode ray tube 17 of Fig. 2.

The relaxation generators 88 and 90 and also the sinusoidal generator 89 are of a well known type of construction. The voltage produced by the sinusoidal generator 89 is then employed in a suitable circuit 94 for rectification and transformation, after phase displacement, into a voltage of special shape that makes it possible to normally cut out the operation of the amplifier stage 91 and to allow this amplifier stage to operate only for the short intervals of time during which it is desired to allow the voltages proceeding from the relaxation generator 90 to pass to the deflection elements of the cathode ray tube 17.

Circuits known to the art make it possible to generate this asymmetrical voltage from a sinusoidal voltage. In order to produce this asymmetrical voltage it is sufficient to rectify the sinusoidal voltage with a delay circuit, i. e. one that provides a small time constant with respect to the period during which there is no voltage at the terminals of a resistance. It is during this short period that the output stage 91 will allow the sawtooth voltage to pass, and the duration of this delay effect is adjusted so that the opening time of circuit 91 will correspond exactly to the duration of a period of the sawtooth generator 90.

The opening time of circuit 91 is made to coincide with that of the sawtooth selected in generator 90, by first suitably dividing before rectification the sinusoidal voltage of generator 89 in any circuit of well known design such as a circuit with resistance and capacity or inductance and capacity. To prevent that two rectified alternations of this sinusoidal voltage produce two opening periods of circuit 91 for one single sawtooth of generator 88, the rectified voltage will have superposed on it by a known method a voltage that is not rectified but that also comes from generator 89 and is suitably displaced in phase to the modulation voltage of the control grid feedback of output stage 91.

Another known process that permits generation of the unblocking voltage of output stage 91 consists in sending from generator 89 two sinusoid at voltages in quadrature and having the same amplitude into an induction distributor that comprises two rectangular stators. The rotor of this induction distributor taps a resultant sinusoidal voltage having a phase, with respect to one of the initial sinusoids, that is a function of the angular position of the rotor. It is then sufficient to detect this sinusoid, as explained above, in order to obtain the unblocking voltage of output stage 91.

Figures 6, 7, 7A, 7B, 9, 12:
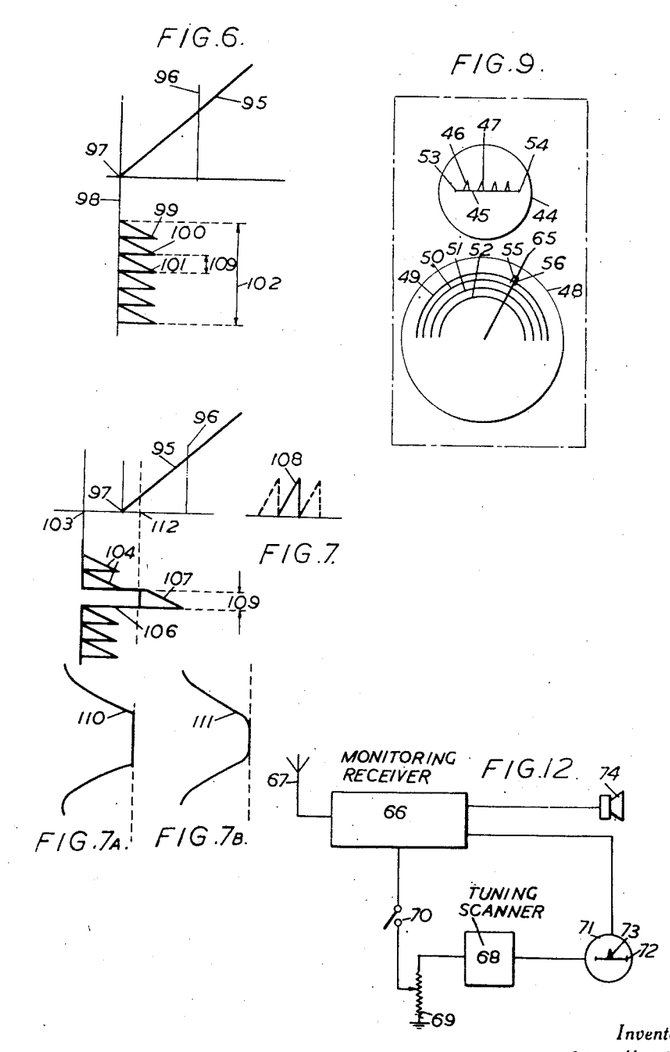
Fig. 6 and Fig. 7 are diagrams used in the explanation of the operation of the circuit of Fig. 5.
Figs. 7A and 7B are modifications of Fig. 7.
Figs. 8 to 11 inclusive illustrate, according to certain features of the invention, other examples of arrangements of indicators that furnish general and detailed control indications.
Fig. 12 illustrates schematically a monitoring receiver circuit arranged to be associated with one of the above indicators, particularly with that of Fig. 9.

Output circuit 91 may consist of an amplifier tube having a plate characteristic like that shown at 95 in Fig. 6 that furnishes a definite output for a grid bias 96 and has a plate current cut off 98 for a negative grid voltage 97. If one applies at this point the sawtooth voltages 99, 100, 101, etc. that proceed from generator 90 of Fig. 5 (the total train of sawteeth 102 corresponding to the scanning time of the main line 1 of Fig. 2), at the terminals of the plate circuit there will be obtained sawtooth voltages that are amplified but that do not permit isolation of one of the sawteeth, e. g. 101, with respect to the others.

If, on the other hand as in Fig. 7, the control grid of this output stage 91 of Fig. 5 is biased very negatively at 103, none of the sawteeth 104 will pass or will be picked up in the plate circuit if the grid is not brought back to a sufficiently positive potential. However, the releasing voltage generated by circuit 94 (Fig. 5) is applied to the grid control circuit of output stage 91. This voltage 106 (Fig. 7) is applied superposed on the sawteeth 104. The sawtooth voltage 107 only passes into the plate circuit at 108 owing to the fact that the working point of the grid of this output stage is brought to a sufficiently positive value 112 by the releasing circuit for the short space of time 109.

By suitably adjusting the releasing voltage in duration and phase it is thus possible to strictly isolate one of the sawteeth, e. g. the sawtooth 107 in the example shown. Releasing voltage 106 may be of very different shapes, e. g. like those shown at 110 and 111, (Figs. 7A and 7B, respectively), the object in view being only to cut out the operation of the vernier indicator during a portion of the scanning of the main indicator. For this purpose use may be made of this releasing circuit or any other circuit that is suitable for acting, not on the scanning circuit that furnishes the rapid sawtooth voltage which can be permanently applied to the vernier cathode ray tube, but either to the control grid of the cathode ray tube in order to vary the luminous intensity of the same, or to the modulation circuit intended for deflecting the spot of the reference line.

Figure 8:
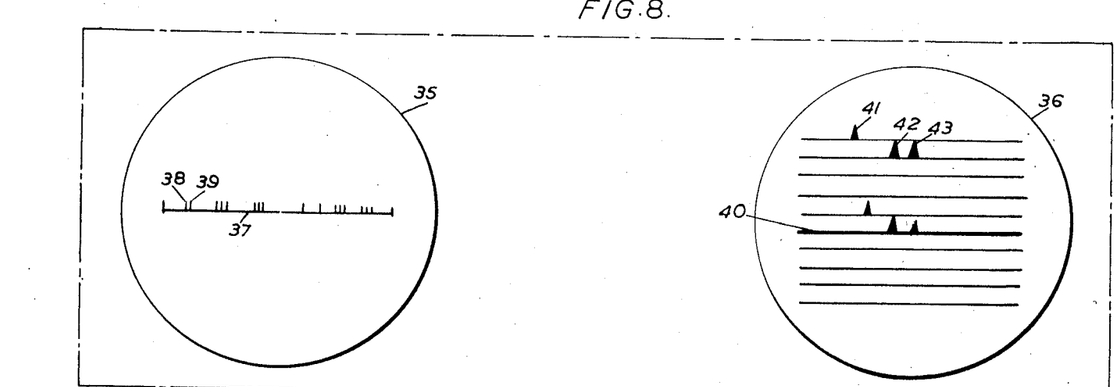

Instead of a vernier having a single reference line, as in the case of Fig. 2, certain features of the invention provide for equipping the second indicating tube with a certain number of reference lines which correspond to various portions of the reference line 1 that is used for general supervision in the frequency band covered by the receiver. Fig. 8 shows an example of this. Two cathode ray tubes 35 and 36 are disposed side by side or one above the other. The output of the control receiver is applied to the first tube 35. The traces 38, 39, etc. of all the transmissions in progress accordingly appear on the reference line 37. To the second tube 36 there is applied a scanning voltage whose frequency is multiple of the frequency of scanning of the receiver, but with the same vertical deflection as for tube 35. A certain number of lines, e. g. ten, are then obtained on tube 36 if the sawtooth voltage applied to this tube is ten times more rapid than the sawtooth voltage that furnishes the line 37 on tube 35. Each of the lines thus obtained has the same length as line 37. The signals from sending stations as indicated at 41, 42, 43, etc. are then distributed over a line ten times longer than 37 and will appear better separated.

In order to effect the vernier scanning of tube 36 with a considerable number of lines corresponding to the reference line 37 of tube 35, use is made of sawtooth voltages of higher frequency than the one used for the scanning of tube 35. The sawtooth voltage 29 of Fig. 3 describes during time 21 a single line having an amplitude 22 that corresponds to the reference line 37 on tube 35, while much more rapid sawteeth such as 25 synchronized to the sawtooth 20 effect the rapid lateral deflections of amplitude 26 so that each corresponds to one of the reference lines 40 on tube 36. The duration 23 of one of these lines will be shortened as the frequency of this second sawtooth voltage is increased. The rapid sawtooth voltage is applied to the horizontal deflecting plates or coils of tube 36, while the slow sawtooth voltage is applied to the vertical deflecting plates or coils of tube 36 at the same time as to the horizontal deflecting elements of tube 35. Owing to the fact that in this case an additional vertical deflection voltage is applied to tube 36 in order to cause the appearance of the traces of the signals, it will be necessary to provide combined modulation circuits or two distinct vertical deflecting devices. For example, it is possible to effect an electromagnetic vertical deflection for the modulation by received signals, and an electrostatic vertical deflection for the scanning. By another method, the traces representing the sending stations may be obtained by applying the received signals to an electrode controlling the luminosity and thus avoid the use of a special or complex deflecting system.

In order to determine the wave range to which the monitoring receiver is switched, which receiver is frequently associated with the control receiver and which scans a frequency range covered by one of the lines 40, one feature of the invention provides for making more luminous the reference line that corresponds to the range explored by the monitoring receiver. For example, it is possible to attenuate the luminosity of all the lines except the one that corresponds to the monitoring receiver and to make this one more intense while continuing to cause the appearance of stations 41, 42, 43, etc. on the other lines and in this way retain continuous supervision.

For this purpose, use may be made of a sinusoidal voltage that is in synchronism with the slow frequency sawtooth voltage 20 and is suitably rectified so as to produce an impulse of suitable duration, the phase of which is adjusted so as to control a tube, relay or any other well known means that permits illumination of tube 36 only during the duration of the selected line. The impulse thus generated by rectification of the sinusoidal voltage has a phase that may be controlled by the position of the range contactor of the monitoring receiver. For example, it is possible to provide a certain number of phase shift combinations of progressive values of the synchronizing sinusoid that correspond to the various contact studs of the contactor. It is also possible by any known means of framing or biasing of the tubes that serve for the scanning system of tube 36 to automatically cause the appearance in the center of or at a desired spot in the cathode ray tube of the line that corresponds to the sub-range that it is desired to observe.

Another example is shown in Fig. 9. In this example, the scanning of the control indicating tube 44 is linear, e. g. by means of a sawtooth voltage that furnishes the reference line 45 on which there appear traces 46, 47, etc. of the transmissions in progress in the total supervised band. On the other hand, the scanning of the vernier tube 48 is circular. Instead of a single circle or semi-circle (the other half being suppressed in order to avoid a double series of indications), a certain number of semi-circles 49, 50, 51, 52, etc. are caused to appear on screen 48 by modifying the diameter of the circular scanning by methods well known to the art, and each semi-circle corresponds to a portion of the supervised frequency band. There can thus be seen on a relatively long scale the indications contained in the relatively restricted space 53, 54 of the indicating tube 44. It must be noted that circular scanning is more suitable than linear scanning from this viewpoint.

Figure 10:
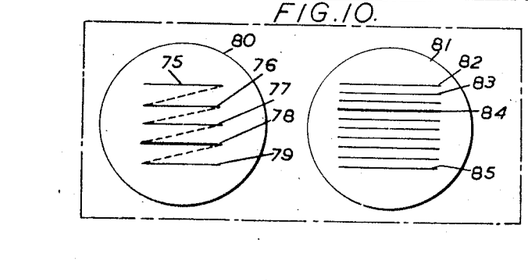

In certain embodiments, the ranges covered by the receiver for observing the transmissions in progress are sufficiently large to require several successive main lines such as lines 75 to 79 on the screen of tube 80 (Fig. 10) in order to show the total frequency exploration of the control receiver, since a single line would not give sufficient detail even for a general indication. In this case the scanning is effected by means of a sawtooth voltage applied to the horizontal deflection elements which has a higher frequency than the frequency of the sawtooth voltage of the vertical scanning. The frequency relation depends on the desired number of lines and the vertically applied sawtooth voltage is synchronized with the electronic scanning voltage of the circuits. The traces of the transmissions in progress may be obtained, as mentioned in connection with Fig. 5, by superposing two systems of vertical deflection, one for the scanning and the other for the modulation, or in one of the other above mentioned manners. Each line 75 to 79, thus produced, corresponds, for example, to a wave range of the monitoring receiver, and a second cathode ray tube 81 may be employed for obtaining the details of the transmissions in progress on a line such as line 78 of tube 80 for example. As explained above, this line 78 is made more luminous than the others, and a rapid frequency scanning is applied to tube 81 in order to furnish a certain number of lines 82, 83, 84, 85, etc. the total frequency length of which corresponds to line 78 of tube 80. A commutation device of any suitable design, or any circuit arrangement siutable for this purpose, permits illumination of the cathode ray tube 81 only during the scanning of line 78, for example. It is possible to use for this purpose the voltage increase necessary for the illumination of line 78 with respect to lines 77 and 79 in order to control the illumination of the cathode ray tube 81 by the release of its modulation grid; the raster 82, 83, to 85 is completely described for each of the lines 75 to 79 of the main tube and is luminous only for one of these lines which it is desired to have stand out, e. g. line 78. The modulations of the received signals are applied in a suitable way to the two tubes 80 and 81. In the same way as described for tube 80, one of the lines, e. g. 84, of tube 81 may be made more luminous or appear alone.

Figure 11:
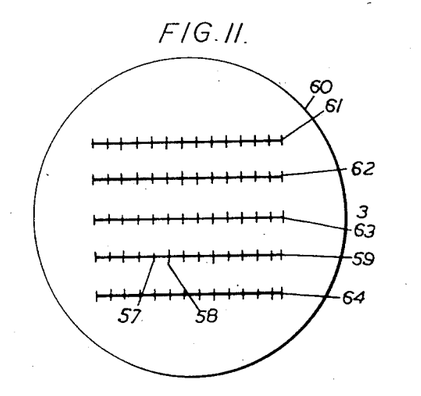

The scanning of the main tube may also be effected in the manner shown in Fig. 11. The main lines 61, 62, etc. will appear slightly luminous and known types of circuits are used for producing, e. g. from abrupt end of line variations of the sawtooth voltages for the scanning of tube 60, brief impulses that modify the traces of the reference line 61 and appear in the form of scale marks, e. g. 57—58 on line 59. The space comprised between two successive scale marks corresponds to one of the lines of tube 81 of Fig. 10. It is also possible to illuminate on the main tube 60 only the small portion comprised between the marks 57 and 58, for example, this portion corresponding to the line that is explored in detail, e. g. 84 on tube 81. A subdivision of this kind of the lines on the main tube makes it possible to rapidly find the subrange in which a transmitting station is located. Scale marks produced by fixed frequencies of oscillatory circuits utilized for this purpose may of course be superposed on these indications.

By another method, the indicating tubes 36 and 48 of Figs. 8 and 9 respectively may be the indicators of the control receiver, the multiple lines corresponding in a known manner to the various ranges of frequencies that are explored. The indicating tubes 35 and 44 then serve for furnishing on a relatively long reference line the traces of the transmissions in progress in a very small portion of the frequency range, e. g. in the portion 55—56 of the circle of Fig. 9 or else of the portion 57—58 on line 59 of Fig. 11.

The pointer 65 shown in Fig. 9 corresponds to the adjustment of a monitoring receiver, it being possible to effect this adjustment to a definite station either for simultaneous monitoring of the stations comprised in the region 55—56 or in a region greater or smaller than the same.

In Fig. 12, the monitoring receiver 66 is connected to an antenna 67 and is subjected to a suitable electronic scanning 68. The device used for causing the appearance of a luminous pointer that corresponds on the adjustment of the monitoring receiver 66 on the screen of the cathode ray tube used for supervision of the transmissions in progress is known per se. The control scanning may be effected at high speed either mechanically or electronically, and independently of the electronic scanning of the frequency of the monitoring receiver. The scanning circuit 68 may consist of a generator of sawtooth voltages and, by means of the potentiometer 69, it is possible to arrange the width of the range scanned by the monitoring receiver. The frequency scanning of the monitoring receiver may be cut off by the switch 70.

When the monitoring receiver is not scanned electronically, it operates as an ordinary receiver to receive from the station to which the pointer 65 is adjusted. When the oscillatory circuit is scanned electronically, the various stations comprised in a narrow frequency range are heard simultaneously. This arrangement is especially recommendable when several stations can operate within a relatively small range for relatively short times that do not necessarily overlap. There would not be sufficient time on each occasion to precisely adjust the receiver to the station without losing a considerable portion of the transmitted signals.

The cathode ray tube 71 is scanned horizontally by the generator 68 and this furnishes the reference line 72. By its output circuit, receiver 66 modulates the spot vertically so as to cause the appearance of the traces representing the stations, such as 73. It is evident that it is possible to use two intermediate frequency paths, one path with a band of greater or less width or of a width and/or frequency position that is adjustable for monitoring, and an intermediate frequency path for the visual indication which may be more selective or consist of quartz filters, for example, that feed the indicator either directly or by means of suitable detector or amplifier circuits.

Figure 13:
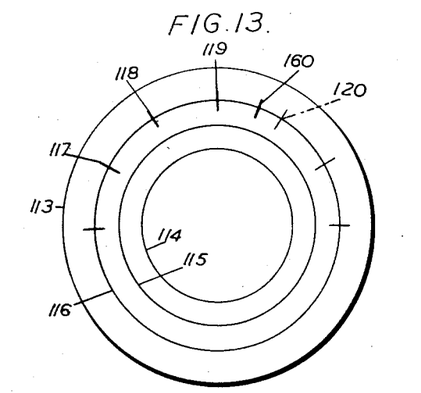
Fig. 13 illustrates still another example of an indicator for general and detailed control indications that employs features of the invention.

Fig. 13 illustrates another method of using a cathode ray tube as indicating instrument for the exploration of a considerable number of ranges, either with or without an additional vernier. In this Fig. 13, screen 113 permits observation, in the form of complete circles 114, 115, 116, of all the ranges covered by the receiver, but the scanning is effected at a slower speed than the exploration of the ranges, each range corresponding to a circle portion 117—118, 118—119, 119—120, etc. The limits of each range are indicated by the guide marks 117, 118, 119, 120, etc., these guide marks being made in the manner explained above in the specification or in any other suitable way. A wide frequency band can thus be covered with a certain number of circles.

In control indicators that employ circular scanning, it is however known that precautions must be taken to avoid the repetition on one semicircle of the indications that already exist on the other semi-circle on account of the symmetry of the frequency scanning of the receiver, either by the mechanical rotation of an element of the tuning circuit or by the electronic scanning of an oscillatory circuit. Unless one semi-circle out of two of the scanning of the indicator is suppressed, e. g. as shown in Fig. 9, it is necessary to provide means for making the spot of the cathode ray indicator describe a complete rotation for a half turn of the rotating plate condenser of the receiver if the frequency scanning of the receiver is effected mechanically. When the scanning of the indicator is effected by means of a coil that rotates around the neck of the cathode ray tube in synchronism with the frequency exploration of the receiver, it is sufficient to double the speed of rotation of the coil and to suppress the action of one scanning out of two on the indicator.

Figure 14:
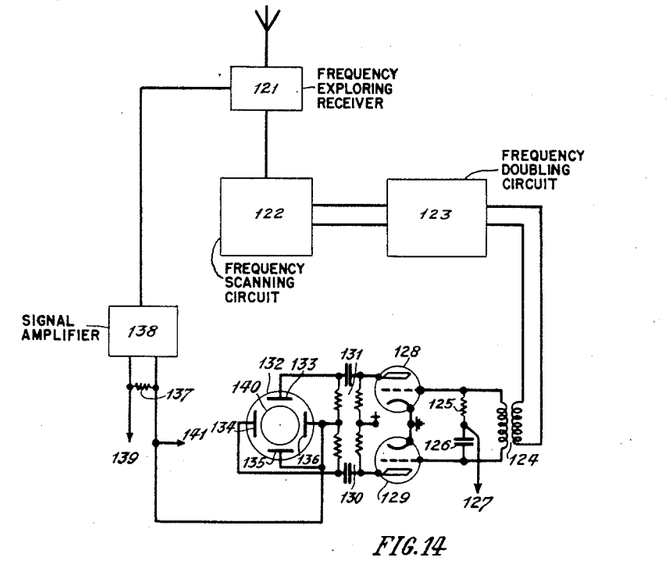
Figs. 14 and 15 illustrate schematically circuits that permit the obtaining of indications like those of Fig. 13.

When however the circular scanning is effected on the cathode ray tube without any mechanical connection of the shaft of the rotating plate condenser with the mechanical shaft of the cathode ray tube, it is necessary to use a voltage of higher frequency for effecting the scanning of the indicator. This will also be the same in the case of an electronic scanning by an alternating voltage if it is desired to only use the frequency exploration in one direction of the alternating voltage e. g. outward. An example of an arrangement for this purpose is shown in Fig. 14 in which 121 indicates the frequency exploring receiver and 122 the mechanical or electronic frequency scanning circuit of the receiver.

Circuit 122 comprises either a rotating plate condenser or any other arrangement that will produce an alternating voltage of the scanning frequency of receiver 121. Circuit 123 may be of any known arrangement that permits the obtaining of a frequency double that of circuit 122, e. g. a frequency doubling circuit or a generator of a frequency double that of the rotating condenser. There is thus obtained in transformer 124 a sinusoidal voltage having a frequency double that of the exploration voltage of receiver 121. This sinusoidal voltage may be put in quadrature by various well known means, particularly that shown as an example and consisting of a resistance 125 and a condenser 126, thus acting on the grids of two amplifier tubes 128 and 129 which may have a suitable bias 127, preferably with a back coupling to earth of the two cathodes of tubes 128 and 129 and a bias at the junction point of the resistance-capacity circuit 125, 126.

The two sinusoidal voltages in quadrature applied to the grids of tubes 128 and 129 are transmitted by the coupling circuits 130 and 131 to the deflection plates 133 and 134 of an indicating cathode ray tube 132. The two pairs of plates may be fed by means of a double symmetrical connection arrangement. The spot describes a circle 140 and makes a complete rotation for a half turn of the scanning condenser of circuit 122. For keying the phase of circle 140 of the cathode ray tube 132 with respect to a fixed guide mark, it is sufficient to modify accordingly the phase of the sinusoid of generator 123 with respect to the frequency scanning of generator 122.

During the undesired period of the frequency scanning, i. e. one half turn out of two of the rotating plate condenser, one rotation out of two of the cathode ray spot is blocked, e. g. by applying a bias to the control grid of cathode ray tube 132 or by any other well known suitable method.

The signals received by receiver 121 are amplified by a circuit 138 and the radial modulation of the circular scanning may be effected in any known manner, e. g. if there is a common back coupling of a symmetrical scanning circuit then by modulating in the back coupling path the common bias of the four grids, or else by modulating the plate voltage of cathode ray tube 132, it being possible to effect this modulation in any known way by modifying the value of the plate voltage by means of the amplifier circuit 138.

Thus, for example, the supply source 139 of the cathode ray tube passes over the plate modulation circuit 137 before going to the supply chain 141 of the various anodes and electrodes of tube 132. This radial modulation will cause the appearance of the deflection traces of the circle that correspond to the stations received by receiver 121, and the angular position of these traces will depend on the frequency of the received stations.

In another variant of an embodiment, the modulation blocking circuit may be applied, not for the extinguishing of the cathode ray tube but for the suppression of the modulating element of amplifier 138, either by giving the grid of the output tube a very negative bias or in any other well known manner.

Figure 15:
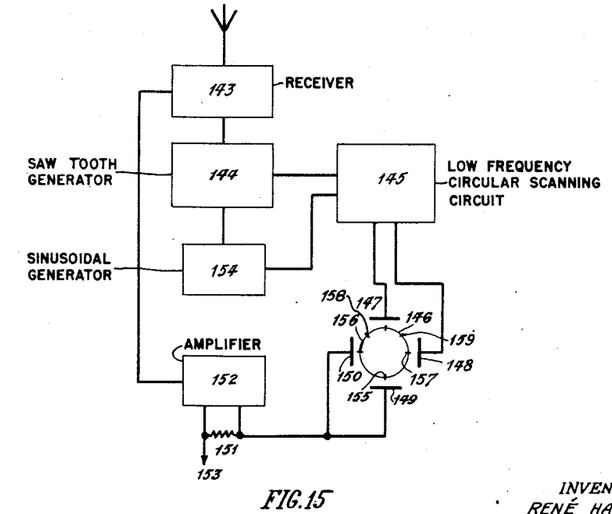

In order to cause the appearance of several ranges explored by the receiver on one circle only as in Fig. 13, use may then be made of a circuit of the kind shown in Fig. 15.

The successive frequency scanning of the various ranges of receiver 143 is effected by circuit 144. This circuit 144 contains a generator, e. g. of relaxation voltage, which effects a frequency scanning for each range. Generator 154 is a sinusoidal generator of lower frequency than that of the sawtooth generator 144. This sinusoidal generator is used for producing, by means of the scanning circuit 145, scanning voltages of the indicating cathode ray tube which are applied to the plates 147, 148 in order to cause the appearance on them of a reference circle 146 which makes a complete rotation for several sawteeth of the generator 144.

In order that the points of this circle may always correspond precisely to an explored range, a sinusoidal voltage produced by generator 154 is rectified in order to produce, according to a well known method, a series of pulses which are applied as synchronization signals to the sawtooth generator 144.

These synchronization pulses may also be used in a manner explained above in connection with Fig. 4 in order to cause the appearance on circle 146 of guide marks such as 155, 156, 157, etc. that delimit the various explored ranges. The fixed guide marks 155, 156, 157 may also be staggered so as to bring them to 158, 159 by using a circuit with progressively variable phase displacement.

The radial modulation that causes the appearance of the traces of the received signals on circle 146 may be produced in any suitable way, e. g. as described in connection with Fig. 14, by means of the amplifier circuit 152, of the power supply 153 and of the plate modulation circuit 151. The suppression of one scanning out of two of the indicator may also be effected in any known manner.

In an indicator of this kind with ranges distributed along the circumference of a circle, it may be advisable to suppress the pointer 65 (Fig. 9) since all the ranges are on the same circle.

In order to obtain visual indication of the frequency to which the monitoring receiver is adjusted, there is produced on the screen of the indicator a luminous trace like 160 (Fig. 13) which is automatically located on the circle and in the range that corresponds to the station or series of stations that are being monitored. Use is made for this purpose of the low frequency beat produced by the frequency changing oscillator of the monitoring receiver on the frequency of the oscillator of the receiver for supervising transmissions which varies continually. When the control receiver, which has its oscillation frequency modulated, passes through the frequency of the oscillator of the monitoring receiver, if the selected intermediate frequencies are the same in the two receivers, the two oscillatory circuits are made to interfere and the beat will be of zero frequency at the exact moment when the two receivers are adjusted to the same reception frequency. The beat frequency increases rapidly on each side of this point of adjustment and away from this point. Thus, for example, if it is 1,000 cycles per second at the moments 161 and 162 shown in Fig. 16, it is of zero frequency at the moment 163 at the point of identical adjustment of the two receivers.

Figures 16, 17, 18:
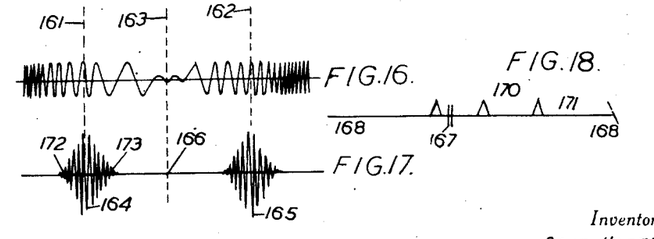
Figs. 16, 17, and 18 show diagrams used for explaining the method of employment of the indicator of Fig. 13 when a monitoring receiver is associated with it.

By using a low frequency selective filter or a circuit tuned to 1,000 cycles, there is obtained a characteristic of the kind shown in Fig. 17 for a circuit fed by such a filter. The voltages 164 and 165 thus produced are, on either side of adjustment point 166, at a distance of 2 kilocycles per second from each other. A different spacing between the two maxima would have been obtained if a different frequency had been selected. Upon examination of the width of the reference line of the control receiver, it can be seen that the two maxima 164 and 165 are combined in a single trace 167 (Fig. 18) on account of the high number of kilocycles per second included between the ends 168 and 169 of the corresponding reference line.

If, then, the adjustment of the tuning condenser is shifted in the monitoring receiver, the guide mark 167 will also become displaced and, since the modulation of the supervision receiver is also controlled by the low frequency filter circuit, the trace 167 will appear automatically at the same places as the traces 170 or 171 of the stations to be monitored. The operation will be the same if it were desired to simultaneously monitor a certain number of stations, as described in connection with Fig. 12.

In case the control receiver is given a very rapid scanning, the passage from point 172 to point 173 of Fig. 17 will take place in a very short time. The time constant of the filter that is used and the selection of the frequency of this filter will consequently depend on the scanning speeds provided for the control receiver.

Various schematic examples of control receivers having a main indicator and vernier indicator will now be described in connection with Figs. 19 to 26, these receivers comprising the principal arrangement similar to that which has just been described. The details of the circuits employed in these figures are not given, being either known or as described above. The means used for suppressing one scanning out of two of the indicating tubes are likewise not shown.

Figure 19:
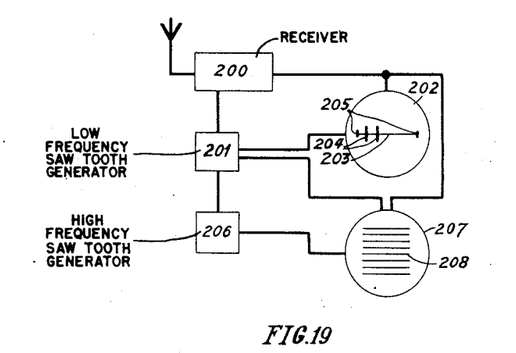
Figs. 19 to 26 show various schematic examples of control receiver circuits that employ features of the invention and that use the various types of indicators of the preceding figures.

Figs. 19 to 22, inclusive, illustrate examples of control receivers for a single range of frequencies and with electronic scanning. In Fig. 19, the control receiver 200 is frequency scanned by means of a low frequency sawtooth generator 201 which furnishes a relaxation voltage that also controls the linear scanning of a cathode ray main indicating tube 202. A reference line 203 appears on the screen of this indicating tube and this line is modulated vertically by the received signals, e. g. as shown at 204. End of scanning guide marks such as 205 may be made as explained above.

A high frequency sawtooth generator 206 that furnishes a relaxation voltage of higher frequency than circuit 201 is synchronized to relaxation circuit 201 and controls the horizontal scanning of a second cathode ray indicating tube 207 that acts as a vernier. The vertical deflection circuits of this cathode ray tube 207 are controlled by the low frequency relaxation circuit 201 in such a way as to cause the appearance on the screen of tube 207 of a certain number of lines 208 subdividing the frequency range, which may be a large one, that is scanned by control receiver 200 and appearing in the form of the reference line 203 on the screen of the main indicating tube 202. The indications of the stations distributed along these lines are obtained by modulation of these vertical deflections circuits in one of the ways explained above.

Figure 20:
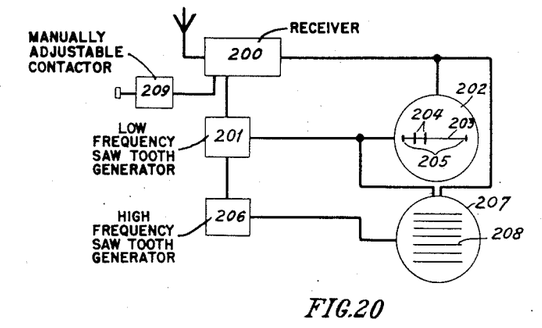

When the control receiver of the transmissions in progress has a certain number of ranges, a manually adjustable contactor 209 may be added to the circuit of Fig. 19, in the manner shown in Fig. 20, in order to shift receiver 200 to the selected range, either mechanically or electromechanically. A contactor of this kind may also be suitably used in the circuits of the subsequent figures.

Figure 21:
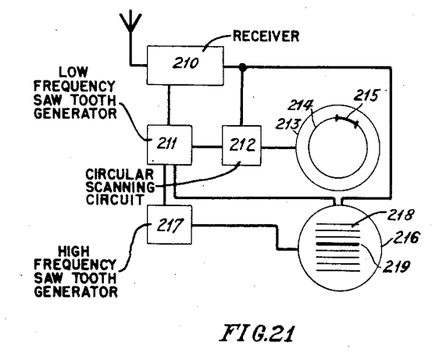
Figures 22, 23:
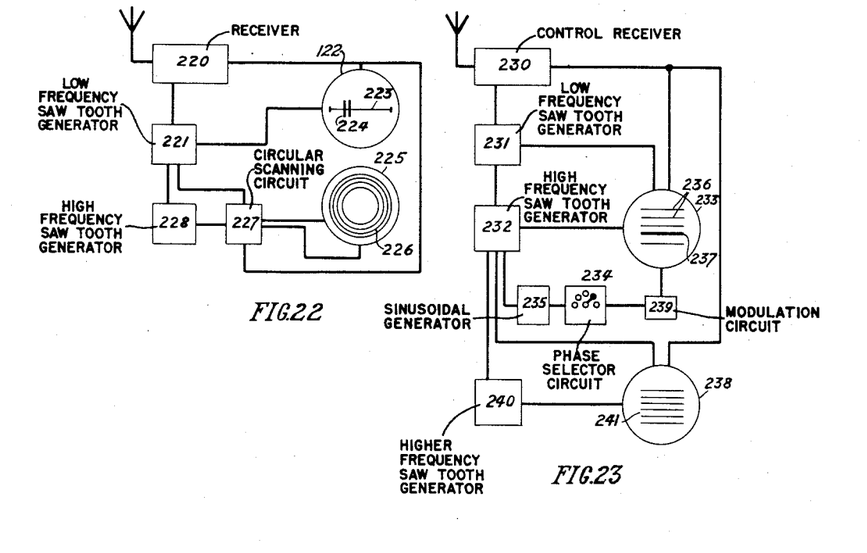

The circuit of Fig. 21 or the circuit of Fig. 22 may be used when it is desired to employ a circular scanning for one or the other of the indicating tubes. In Fig. 21, the frequency exploration of receiver 210 is effected by the low frequency relaxation circuit 211 which is synchronized by the circular base 212. This latter base is modulated by the signals received by receiver 210 and serves for the scanning and the radial modulation of the main indicating tube 213. The reference circle 214 modulated radially by the received signals appears on the screen of this tube 213. One portion only of this circle, e. g. 215, may be made luminous or made more luminous than the rest of the circle in order to define the frequency region in which the vernier indicator 216 is operating.

This vernier indicating tube 216 is given a linear scanning that is controlled by the high frequency relaxation circuit 217 synchronized to the slow relaxation circuit 211 and its vertical deflection circuits are controlled by the output of circuit 211 and the output signals of receiver 210. On its raster 218 there may appear one line more luminous than the rest or only one luminous line 219 which corresponds to the portion 215 of circle 214 of the main indicator 213, as described above in the specification.

In Fig. 22, on the other hand, the main indicating tube 222 that gives the general indications of the signals received by receiver 220 during the frequency exploration effected by the slow relaxation circuit 221 is controlled by the said circuit 221 in such a way as to show a reference line 223 on which the stations, such as 224, appear. The vernier indicating tube 225 is scanned circularly, as indicated by the reference circles 226, by means of a circular scanning circuit 227 through the circuits 227, 221 and 228 the tube 225 is modulated radially by the signals received by receiver 221. Circuit 227 synchronizes the operation of the relaxation circuit 228 that modulates the slow sawtooth voltage of circuit 221 so that this modulated voltage of circuit 221 may control the circular base 227 in order to produce the radial traces of the stations on the circles 226.

When the frequency scanning of the control receiver is effected by means of a sawtooth voltage of relatively great amplitude to cover a wide range then it is advisable to effect the main scanning in the form of a certain number of successive lines on the main cathode ray tube and thus increase the length of the line on which the stations appear.

In Fig. 23, which illustrates one example of a device of this kind, control receiver 230 has its frequency scanning controlled by a slow relaxation circuit 231. A more rapid and synchronized sawtooth voltage furnished by circuit 232 is intended for the horizontal scanning of the main indicating tube 233, while the slow sawtooth voltage of circuit 231 is applied with the received signals to the vertical deflection circuits of the indicating tube 233. By means of a phase selector circuit 234 fed by a sinusoidal generator 235 that is synchronized with the rapid sawtooth voltage of circuit 232, the illumination of one of the reference lines 236 is controlled, e. g. that of line 237 which it is desired to explore in greater detail by means of the vernier tube 238. This illumination is produced, for example, by having the sinusoidal voltage of selected phase act on the modulation circuit 239 for the grid of cathode ray tube 233. Vernier tube 238 has its vertical scanning controlled by the sawtooth voltage generated by circuit 232 that serves for the horizontal scanning of the main tube 233, and by the signals received by receiver 230. The horizontal scanning of this vernier tube 238 is controlled by a third sawtooth voltage generator 240 synchronized with the sawtooth generator 232 controlling the horizontal scanning of tube 233. Circuit 240 has a still higher frequency than 232. The luminous raster 241 that appears on vernier tube 238 may also be controlled so as to be made luminous only during the scanning time of the particular explored range that corresponds to the luminous line 237 on the main tube 233.

Figure 24:
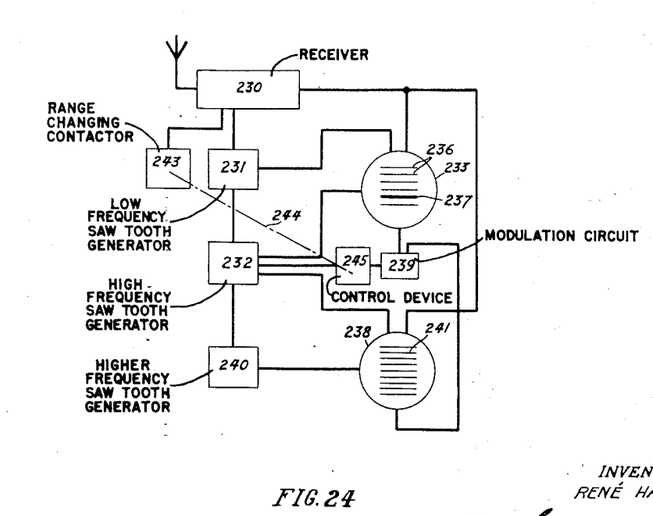

An arrangement of this kind is likewise indicated in the circuit of Fig. 24 in which the control receiver 230 is furthermore provided with a range changing contactor 243. This contactor is mechanically coupled, as indicated by the dot-and-dash line 244, to a control device 245 of the grid modulator 239 which can replace the sinusoidal generator 235 and the phase selector 234 of Fig. 23, or which is arranged so as to directly modulate the grid voltage of tube 233 without having to use a sinusoidal voltage.

Instead of illuminating line 237 more strongly than the others, it is possible to provide a blocking arrangement of such a kind that the modulation of receiver 230 will only occur on the line of the main indicating tube 233 that corresponds to the selected range.

In case the control receiver has only one single wave range but is associated with a monitoring receiver that has several ranges, then the commutator of the ranges of the monitoring receiver would similarly control the more intense illumination of the range to which the monitoring receiver is adjusted.

Figure 25:
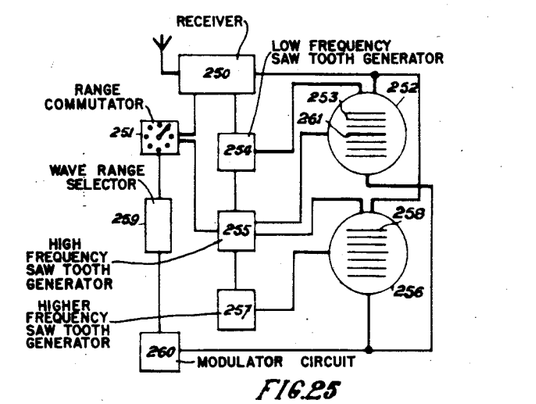
Figure 26:
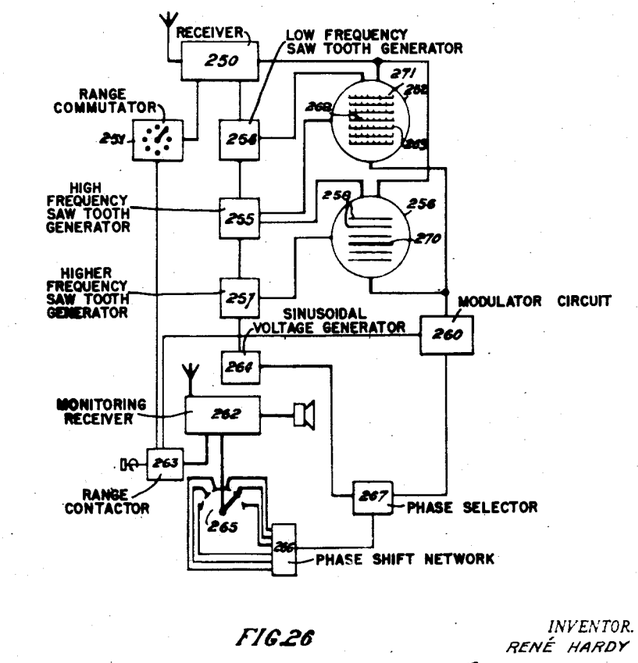

Figs. 25 and 26 illustrate two examples of embodiments of vernier control receivers with electronic scanning and automatic commutation of the ranges that make it possible to scan successively a certain number of ranges covered by receiver 250 with different self-inductance and capacity values. The automatic range commutator 251 may be mechanical or electromechanical and may consist of any suitable relay, rotating contact or other commutation device for switching the receiver in synchronism with the scanning to all the ranges successively, so that on the main indicating tube 252, each line 253 will correspond to an explored frequency range. The total scanning can be effected in a time sufficiently short for persistence in the retina and for simultaneous showing of all the lines in order to obtain an image of the scanning raster of tube 252.

The sawtooth voltage furnished by the low frequency relaxation circuit 254 (Fig. 25) serves simultaneously for the frequency exploration of receiver 250 and the vertical scanning of cathode ray tube 252. It is synchronized with a more rapid sawtooth voltage generated by circuit 255 which serves simultaneously for the horizontal scanning of the main indicating tube 252 and for the vertical scanning of the vernier indicating tube 256.

A third scanning circuit 257, of higher frequency than circuit 255 and synchronized therewith, effects the horizontal scanning of the vernier indicating tube 256. The reference raster on the screen of this tube consequently appears as consisting of a certain number of lines 258 that give the detail of one of the lines 253 of the raster of tube 252.

A second vertical scanning control of the two tubes 252 and 256 is effected from control receiver 250 in order to show on the reference lines the traces of the transmitting stations.

In order to determine the more particularly explored wave range that is to be shown in detail on vernier tube 256, a manually controlled line selector (or wave range selector) 259 is associated with the automatic range commutator so as to control the grid modulator 260 for the purpose of making one of the reference lines more luminous than the others or only one of the lines luminous, e. g. 261 on the screen of tube 252, and of making the scanning of tube 256 effective during the exploration of the selected range and thus obtain on the screen of this tube the detail of the transmissions in progress within this range.

When use is made of a monitoring receiver in parallel with the receiver for supervision of the transmissions (Fig. 26), the same combination of three scanning circuits 254, 255 and 257 is employed to control the two indicators 252 and 256. It is however desirable for each line of vernier tube 256 to give the detail of the range portion to which the monitoring receiver 262 is adjusted.

The range contactor 263 of the monitoring receiver controls the grid modulator 260 of cathode ray tubes 252 and 256. Furthermore, a sinusoidal voltage generator 264 that is synchronized with the rapid relaxation circuit 257 feeds a phase selector 267 that is controlled by commutator 265 in association with a phase shift network 266. Commutator 265 rotates with the variable condenser of the monitoring station and adjusts the phase shift network 266 to a value that corresponds to the position of the said variable condenser. The output of phase selector 267 is applied to grid modulator 260.

In this way, while range contactor 263 controls the grid modulator for determining the range on which the indications are to appear, phase selector 267 controls the modulator in order to illuminate the narrow range portion to which monitoring receiver 262 is adjusted. This is, for example, the portion 268 of line 269 of the main tube 252, and line 270 of the vernier tube 258. Furthermore, as shown at 271, it is possible to cause the appearance, in the manner described in connection with Fig. 4, of the luminous guide marks that delimit the length of the lines of the vernier.

It is evident that, in the various examples shown in Figs. 19 to 26, use may be made of circular or spiral scanning circuits instead of linear scanning circuits for the various indicators.

It is also evident that the invention is not limited to the various examples of embodiments shown and described but, on the contrary, is capable of numerous modifications and adaptations without departing from its scope.

What is claimed is:

1. A system for analyzing a predetermined band in the radio frequency spectrum which comprises a receiver, means repeatedly to tune said receiver through said frequency band, a cathode ray tube, means to cause the electron beam of said cathode ray tube to sweep along a predetermined path in said tube each time said receiver is tuned through said band, means to cause the electron beam of said tube to deviate from said path whenever a signal is received by said receiver, a second cathode ray tube, means to cause the electron beam of said second cathode ray tube to sweep along a predetermined path when said receiver is tuned through a selected small portion of said frequency band, said portion of the frequency band which is selected for controlling the second cathode ray tube is indicated on the first cathode ray tube by means producing deviations of the electron beam of said first cathode ray tube at the beginning and end of the selected portion of the frequency band, and means to cause the electron beam of said second cathode ray tube to deviate from said path when signals are received by said receiver in said portion of said frequency band.

2. A system for analyzing and monitoring a predetermined band in the radio frequency spectrum, which comprises a receiver, means repeatedly to tune said receiver through said frequency band, means to indicate the position in said band of any signals received by said receiver as it is tuned through said band, a monitor receiver adapted to be tuned to another frequency within said band, and means to indicate on said indicating means the particular frequency to which said monitor receiver is tuned.

3. A system, as defined in claim 2, in which the indicating means comprises a main indicating means and a vernier indicating means.

4. A system for analyzing and monitoring a predetermined band in the radio frequency spectrum, which comprises a receiver, means repeatedly to tune said receiver through said frequency band, a first cathode ray tube, means to cause the electron beam of said first cathode ray tube to trace a predetermined path each time said receiver is tuned through said frequency band, means to cause signals received by said receiver to produce a deviation of said electron beam from said path, a second cathode ray tube, means to cause the electron beam of said second cathode ray tube to trace a predetermined path each time said receiver tunes through a selected portion of said frequency band, a monitor receiver adapted to be tuned to any frequency within said band, and means to indicate on one of said cathode ray tubes the particular frequency to which said monitor receiver is tuned.

5. A system, as defined in claim 4, in which the indication of the position of the monitor receiver in the frequency band is determined by an increase in luminosity of the trace of the electron beam of one of said cathode ray tubes.

6. A system, as defined in claim 4, in which means is provided for manually tuning said monitor receiver and means is also provided under control of said manually tuning means to increase the intensity of the electron beam in the second cathode ray tube during that portion of its path which corresponds to the frequency to which said monitor receiver is tuned.

7. The combination of means for receiving signals from different sources at different times over a predetermined interval, a pair of cathode ray oscillographic devices each having a viewing screen, means to sweep the ray of one of said devices across the screen thereof in a trace formed of a plurality of spaced parallel paths, means normally to maintain the ray of the other of said devices interrupted, means for turning on the ray of the other device during only a fraction of the interval of said trace corresponding to an integral number of said parallel paths, means for sweeping the ray of said other device across its viewing screen on an expanded scale during said fractional interval, and means to control both of said beams by the received signals during their traversal of their respective traces.

8. A combination according to claim 7 and including means for shifting in time the fractional interval during which said other device is turned on.

9. A combination according to claim 7 and including means controlling said one device for producing a recognizable variation in a fractional part of the trace thereof to indicate the fractional interval during which said other device is turned on.

10. A system for analyzing a predetermined band in the radio frequency spectrum which comprises a receiver, means repeatedly to tune said receiver through said frequency band, a cathode ray tube, means to cause the electron beam of said cathode ray tube to sweep along a predetermined path in said tube each time said receiver is tuned through said band, means to cause the electron beam of said tube to produce an indication on the screen of the tube whenever a signal is received by said receiver, a second cathode ray tube, means acting normally to maintain the beam of said second tube interrupted, means to cause the electron beam of said second cathode ray tube to sweep along a predetermined path when said receiver is tuned through a selected small portion of said frequency band, means to turn on the beam of said second tube when said receiver is tuned to said selected portion, and means to cause the electron beam of said second cathode ray tube to produce an indication on the screen of the tube when signals are received by said receiver in said portion of said frequency band.

11. A system according to claim 10 and including means for shifting the position in said spectrum of said selected portion during which said second cathode ray tube is turned on.

12. A system according to claim 10 and including means controlling the beam in said first cathode ray tube for producing a recognizable variation in the trace thereof during said selected portion of said frequency band.

RENÉ HARDY.

References Cited in the file of this patent

UNITED STATES PATENTS

| Number | Name | Date |
|---|---|---|
| Re. 22,150 | Bagno et al. | Aug. 4, 1942 |
| 1,917,268 | Mirick | July 11, 1933 |
| 1,994,232 | Schuck | Mar. 12, 1935 |
| 2,084,760 | Beverage | June 22, 1937 |
| 2,213,886 | Potter | Sept. 3, 1940 |
| 2,275,460 | Page | Mar. 10, 1942 |
| 2,279,151 | Wallace | Apr. 7, 1942 |
| 2,312,761 | Hershberger | Mar. 2, 1943 |
| 2,355,363 | Christaldi | Aug. 8, 1944 |
| 2,405,238 | Seeley | Aug. 6, 1946 |
| 2,408,414 | Donaldson | Oct. 1, 1946 |

OTHER REFERENCES

The Cathode Ray Oscillograph in Radio Research, by Watson Watt, published by His Majesty's Stationery Office, London, 1935, pages 81 to 89.

Panoramic Radio Spectroscopes, published by Panoramic Radio Corp., New York city, July 22, 1942.